April 13, 1948.  C. H. BRADY  2,439,712
PLUMBING FITTING
Filed June 11, 1946
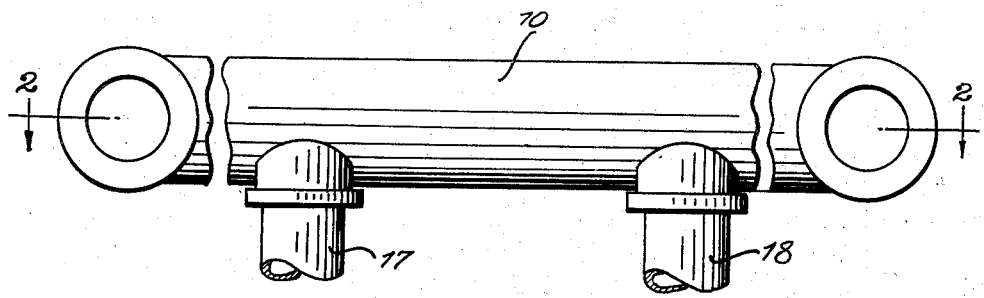
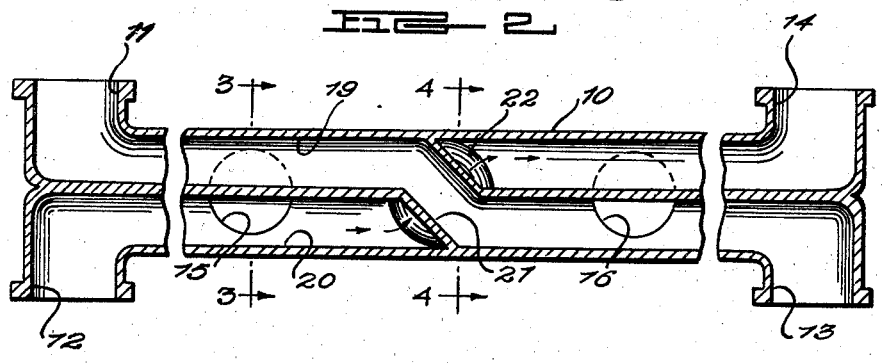
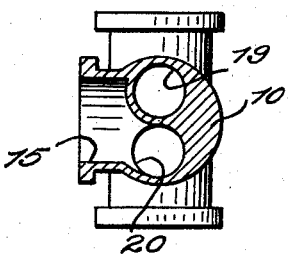 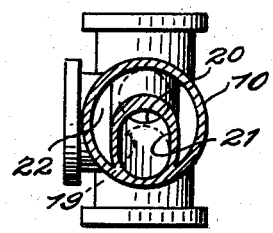
Inventor
CLYDE H. BRADY
By Clarence A. O'Brien
and Harvey B. Jacobson
Attorneys Patented Apr. 13, 1948

2,439,712

UNITED STATES PATENT OFFICE 2,439,712

PLUMBING FITTING

Clyde H. Brady, Danville, Va.

Application June 11, 1946, Serial No. 675,983

2 Claims. (Cl. 285—210)

This invention relates to a plumbing fitting and more particularly to a fitting for use in connection with lavatories, washtubs or the like which may be arranged back-to-back.

It is a well-known fact that in the installation of plumbing, in dwellings, office buildings, industrial washrooms, and the like that the most advantageous and economical method to employ is to utilize common supply lines for the plumbing fixtures to be installed where the fixtures can be placed back-to-back, as for instance, in adjoining washrooms, bathrooms, and the like. Also, in industrial washrooms it is common practice in order to effect economies in both installation costs and space to place the washstand back-to-back so that both stands facing in opposite directions may be fed with hot and cold water from the same pipes. Due to the fact that it is customary to have the cold water fed from the right-hand side of a washstand, while the hot water is fed from the left-hand side of the stand it is important that the piping be so arranged as to deliver the hot and cold water to the proper sides of the oppositely disposed lavatory. As a consequence, a complicated piping arrangement is necessary at each pair of washstands in order to deliver the hot and cold water in proper relationship to both stands. Scalding and serious injury has frequently occurred in places where the stands were improperly connected to the piping system and consequently it is of paramount importance, particularly in industrial washrooms, to have the hot and cold water connections to the faucets of all washstands uniform.

The primary object of this invention is to insure the proper delivery of hot and cold water to washstands, lavatories and the like when they are placed back-to-back.

Another object is to avoid injury to the users of industrial washstands or lavatories.

A further object is to avoid the complicated piping arrangement now commonly employed to insure the correct coupling of the hot and cold water faucets of a washstand to the hot and cold water supply system.

The above and other objects may be attained by employing this invention which embodies among its features an elongated body having oppositely disposed discharge openings at each end, said body also having spaced parallel inlet openings intermediate its ends, said body having longitudinal passages establishing communication between oppositely disposed discharge openings at opposite ends of the body and with an inlet opening whereby fluid entering an inlet opening will be discharged in opposite directions at opposite ends of the body. Other features include disposing the inlet openings perpendicular to the discharge opening.

In the drawings:

Figure 1 is a side view of a plumbing fitting embodying the features of this invention, Figure 2 is a longitudinal sectional view taken substantially along the line 2—2 of Figure 1, Figure 3 is a transverse sectional view taken substantially along the line 3—3 of Figure 2, and Figure 4 is a transverse sectional view taken substantially along the line 4—4 of Figure 2.

Referring to the drawings in detail, an elongated body 10 is provided at opposite ends with oppositely disposed discharge openings 11, 12, 13 and 14. The openings at opposite ends of the body while discharging in opposite directions align axially and may be internally or externally screw threaded to afford coupling means for the plumbing piping or fittings. Formed intermediate the ends of the body 10 are inlet openings 15 and 16 which may be coupled to the hot and cold water supply pipes 17 and 18, respectively, of a plumbing system. Extending longitudinally through the body 10 is a bore or passage 19, one end of which communicates with the discharge opening 11 while its opposite end communicates with the discharge opening 13. This passage also communicates with the inlet opening 16 and it will thus be seen that when facing the fitting with the cold water pipe 18 connected to the inlet opening 16, cold water will be discharged from the right-hand side of the fitting. The body 10 is also formed with a longitudinal passage 20 which establishes communication between the discharge openings 12 and 14 and also with the inlet opening 15 so that when hot water flows through the pipe 17 it will be discharged from opposite ends of the fitting in opposite directions. As a consequence a person facing the fitting will find that the hot water is delivered to his left, irrespective of the side of the fitting upon which he is standing.

Since both ends of the fitting are symmetrical it is obvious that so long as the pipe 17 to the left is connected to the hot water supply, and the pipe 18 is connected to the cold water supply, the position in which the fitting is installed is unimportant so that it may be reversed with the inlet passage 16 connected to the pipe 17 and the inlet passage 15 connected to the pipe 18 with the result that the cold water will be delivered to the right of one facing the fitting, while hot water will be delivered to the left. This effect is accomplished by the cross-over passages 21 and 22 formed intermediate the ends of the fitting and between the openings 15 and 16.

While in the foregoing there has been shown and described the preferred embodiment of this invention it is to be understood that minor changes in the details of construction, combination, and arrangement of parts may be resorted to without departing from the spirit and scope of the invention as claimed.

I claim:

1. A plumbing fitting comprising an elongated body having oppositely disposed discharge openings at each end, said body also having spaced parallel inlet openings intermediate its ends and said body having longitudinal passages establishing communication between oppositely disposed discharge openings at opposite ends of the body and with an inlet opening intermediate the ends of the body whereby fluid entering an inlet opening will be discharged in opposite directions at opposite ends of the body.

2. A plumbing fitting comprising an elongated body having oppositely disposed axially aligned discharge openings at each end, said body also having spaced parallel inlet openings intermediate its ends, said inlet openings lying along axes perpendicular to the body and to the axes of the discharge openings and said body having longitudinal passages establishing communication between oppositely disposed discharge openings at opposite ends of the body and with an inlet opening whereby fluid entering an inlet opening will be discharged in opposite directions at opposite ends of the body.

CLYDE H. BRADY.

REFERENCES CITED

The following references are of record in the file of this patent:

UNITED STATES PATENTS

| Number | Name | Date |
|---|---|---|
| 1,324,929 | Rutz et al. | Dec. 16, 1919 |

FOREIGN PATENTS

| Number | Country | Date |
|---|---|---|
| 80,782 | Sweden | 1934 |